Oct. 19, 1937.                C. R. STOULIL                2,096,656
                            SCRAPER FOR TRACTORS
                            Filed March 29, 1937
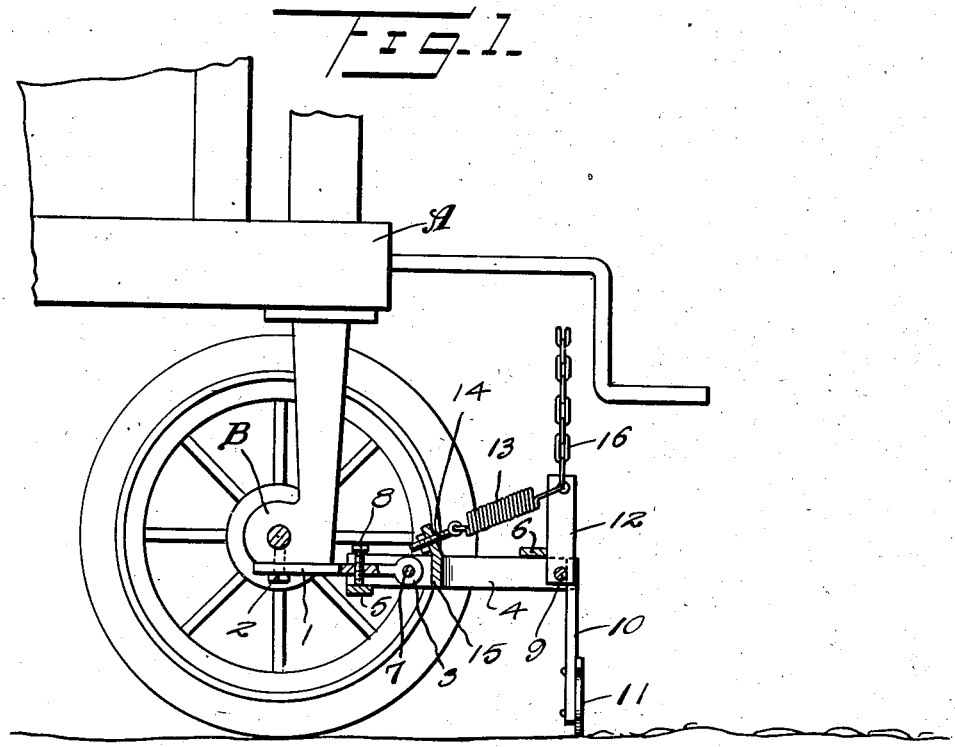
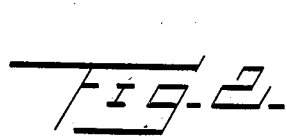
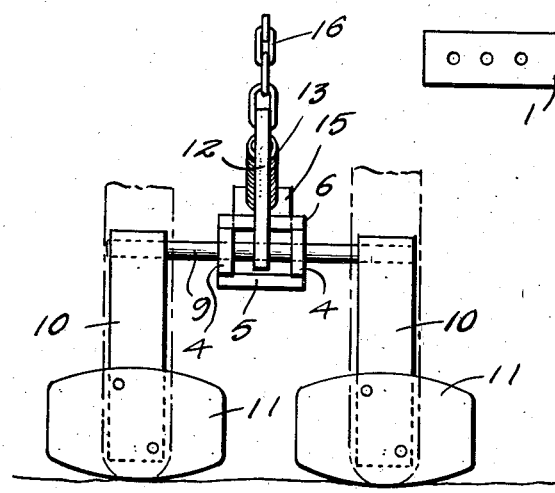
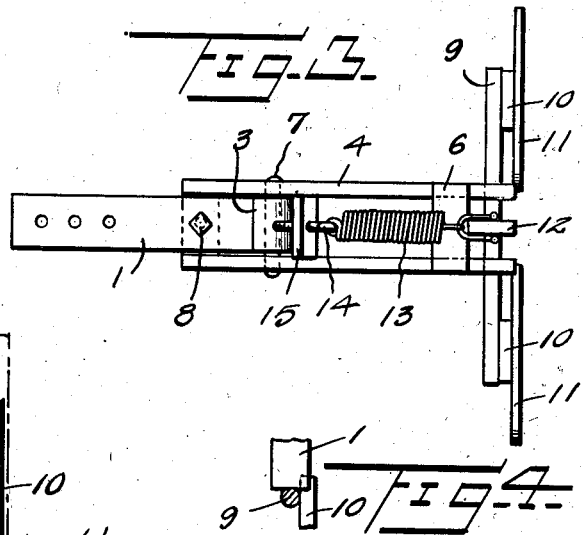
C. R. Stoulil
INVENTOR
BY Victor J. Evans & Co.
ATTORNEY Patented Oct. 19, 1937

2,096,656

UNITED STATES PATENT OFFICE 2,096,656

SCRAPER FOR TRACTORS

Charles R. Stoulil, Pocahontas, Iowa

Application March 29, 1937, Serial No. 133,668

3 Claims. (Cl. 280—160)

This invention relates to ground scrapers, and its general object is to provide a scraper that is primarily designed for use on tractors, especially of the field work type, to level the ground in advance of the front wheels thereof, to provide a smooth traveling surface therefor, with result my scraping device will over-come all of the well known difficulties caused by the uneven ground surfaces and allow normal driving and operation of the tractor at all times.

A further object is to provide a scraping device for tractors, that will over-ride fixed obstructions, thereby preventing damage or breakage to the parts and is manually movable into and out of use.

Another object is to provide a ground scraping device of the character set forth, that can be readily applied to all types of tractors, is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a vertical sectional view taken through the scraping device which forms the subject matter of the present invention, applied to one type of tractor.

Figure 2 is a front view thereof.

Figure 3 is a top plan view of a device per se.

Figure 4 is a detailed view of a slightly modified form of connecting means.

Referring to the drawing in detail, letter A indicates a tractor of the type that includes a front axle housing B, to which is attached the scraping device which forms the subject matter of the present invention. However, I want it understood that my device can be applied to any type of tractor, for use therewith during field work.

The device includes an attaching arm 1 provided with a plurality of openings adjacent one end portion thereof to receive a screw bolt 2 for disposal through any one of the openings, for adjustably fixing the arm to the axle housing as shown, and the arm terminates at its forward end in a bearing collar 3.

The body of the scraping device includes a pair of spaced parallel elongated strips 4 that are secured together at their rear ends by an abutment block 5, and adjacent to their forward ends by an abutment block 6, the block 5 bridging the under sides of the strips 4 while the block 6 bridges the upper sides thereof, as best shown in Figure 1.

The body is pivotally secured to the attaching arm 1 by a pivot pin 7 which is mounted in the bearing collar 3 and extends through the strips 4, as best shown in Figure 3. The body is held in normal horizontal position by a screw bolt 8 that is threaded through the attaching arm 1 and engages with the rear abutment block 5. That structure also provides for vertical adjustment of the scraping device, so that the scraping elements which will be presently described can be adjusted with respect to the ground, as will be apparent upon inspection of Figure 1.

Mounted in bearing openings adjacent to the forward ends of the body strips 4, is a shaft 9 which is of a length to extend a considerable distance laterally of the strips 4 and secured to the outer ends of the shaft 9 and depending therefrom are the shanks or arms 10 of scraping blades 11, the blades being fixed to the lower ends of the arms 10 by rivets or other suitable securing means, and are shown as being of substantially oval formation, with straight ends that merge into the upper and lower curved edges thereof, by rounded corners as clearly shown in Figure 2.

Secured to and rising from the shaft 9 for disposal between the body strips 4 is a lever 12 which is shown in Figure 1 as having the shaft extending therethrough, but in Figure 4 the lever is shown as being welded to the shaft. In any event, the lever normally rests against the abutment block 6, and is held accordingly by a coil spring 13 which has its outer end connected to the upper end of the lever, while the opposite end has secured thereto an eye bolt 14 that extends through an opening in the rearwardly inclined upper end portion of a bracket strip 15, the latter being fixed between the body strips, and the eye bolt is provided with a nut as shown for adjusting the spring, as will be apparent. By the construction, it will be obvious that the blades are normally held in vertical position, directly in advance of the front wheels of the tractor, but should the blades contact a fixed abutment, such as a rock, stump or the like they will be removed rearwardly against the action of the spring 13, to override the obstruction thereby preventing breakage or damage to the parts.

The scraping elements are disposed into and out of use, through the instrumentality of lifting means which preferably includes a chain 16 that is connected to the upper end of the lever 12, and the chain is connected to suitable means which is manually actuated from the driver's seat of the tractor.

It will be obvious that when the scraping elements are lifted, the body moves on the pivot pin 7, and when released they will fall by gravity to their normal position as shown in Figure 1.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A scraper attachment for a tractor, comprising an attaching arm, means for adjustably securing the attaching arm to the tractor, a body pivotally secured to the attaching arm, a shaft journaled in the body, arms secured to and depending from the shaft, scraping blades fixed to the lower ends of the arms and disposed in advance of the front wheels of the tractor, a lever secured to the shaft and rising therefrom, abutment means secured to the body and arranged in the path of the lever, spring means for holding the lever engaged with the abutment means, and means for adjusting the height of the blades and holding the body normally positioned with respect to the attaching arm.

2. A scraper attachment for a tractor, comprising an attaching arm, means for adjustably securing the arm to the tractor, a body pivotally secured to the attaching arm and extending forwardly therefrom, a shaft journaled in the forward end of the body and extending laterally thereof, arms secured to and depending from the outer ends of the shaft, scraping blades fixed to the lower ends of the arms and disposed in advance of the front wheels of the tractor, a lever secured to and rising from the shaft, a bracket secured to the body, spring means connected to the lever and adjustably mounted in the bracket, abutment means on the body and arranged in the path of the lever, means for holding the body normally positioned with respect to the attaching arm and including screw means, and abutment means engaged by the screw means and cooperating therewith for adjusting the height of the scraping blades.

3. A scraper attachment for a tractor, comprising an attaching arm, means for adjustably securing the attaching arm to the tractor, a body pivotally secured to the attaching arm and extending forwardly therefrom, a shaft journaled in the forward end of the body, arms secured to the shaft and depending therefrom, scraping blades fixed to the arms and arranged in advance of the front wheels of the tractor, a lever secured to and rising from the shaft, abutment means secured to the body and arranged in the path of the lever, adjustable spring means for holding the lever against the abutment means, abutment means secured to the body, screw means engageable with the latter abutment means for holding the body normally positioned with respect to the attaching arm and for adjusting the height of the scraping blades, and lifting means connected to the lever for moving the body on its pivot for disposing the scraping blades into and out of use.

CHARLES R. STOULIL.